United States Patent [19]

Hojell et al.

[11] Patent Number: 5,210,521
[45] Date of Patent: May 11, 1993

[54] VEHICLE ALARM APPARATUS AND METHOD FOR PREVENTING INJURY TO NEARBY PERSONS

[75] Inventors: Gary M. Hojell, 752 Ridge Road Ter., Kinnelon, N.J. 07405; Barry Abilevitz, Brooklyn, N.Y.

[73] Assignee: Gary M. Hojell, Kinnelon, N.J.

[21] Appl. No.: 558,167

[22] Filed: Jul. 26, 1990

[51] Int. Cl.⁵ .......................................... B60Q 1/00
[52] U.S. Cl. ................................ 340/436; 340/426; 340/433; 340/903; 340/561; 340/552
[58] Field of Search ............... 340/901, 903, 904, 436, 340/433, 552, 562, 435, 426, 561; 364/461

[56] References Cited

U.S. PATENT DOCUMENTS

| | | | |
|---|---|---|---|
| 2,660,718 | 11/1953 | Summerhayes et al. | 340/552 |
| 4,016,529 | 4/1977 | Inuzuka et al. | 367/93 |
| 4,028,690 | 6/1977 | Buckley et al. | 340/552 |
| 4,135,185 | 1/1979 | Rotman et al. | 340/552 |
| 4,257,010 | 3/1981 | Bergman et al. | 340/562 X |
| 4,260,980 | 4/1981 | Bates | 340/904 |
| 4,278,962 | 7/1981 | Lin | 367/909 X |
| 4,300,116 | 11/1981 | Stahovec | 340/904 |
| 4,322,722 | 3/1982 | Kozdon | 340/552 X |
| 4,382,291 | 5/1983 | Nakauchi | 367/93 |
| 4,422,075 | 12/1983 | Nerheim | 342/52 |
| 4,467,313 | 8/1984 | Yoshino et al. | 340/904 |
| 4,543,577 | 9/1985 | Tachibana et al. | 340/904 |
| 4,623,032 | 11/1986 | Kemmer | 340/904 X |
| 4,661,936 | 4/1987 | Magee et al. | 367/94 |
| 4,766,421 | 8/1988 | Beggs et al. | 340/904 |
| 4,779,095 | 10/1988 | Guerreri | 340/904 |
| 4,797,673 | 1/1989 | Dombrowski | 340/904 |
| 4,801,938 | 1/1989 | Holmes | 340/904 X |
| 4,818,997 | 4/1989 | Holmes | 340/904 X |
| 4,849,731 | 7/1989 | Melocik | 340/435 |
| 4,864,298 | 9/1989 | Dombrowski | 340/904 |

OTHER PUBLICATIONS

"The Purpose Of This Product Is Alarming", School Bus Fleet, pp. 41–47, Apr./May 1989.

*Primary Examiner*—Donnie L. Crosland
*Attorney, Agent, or Firm*—Glen M. Diehl

[57] ABSTRACT

A vehicle alarm for preventing injury to persons near the vehicle. Persons under and around a vehicle such as a school bus are detected by establishing an energy field and monitoring for disturbances therein. At least one transmitter establishes the energy field in areas of high risk. One or more receivers detect a signal resulting from the energy field. These signals are monitored by a processor unit for amplitude variations therein. The processor unit preferably stores the amplitude of the received signal when no persons are present and establishes one or more thresholds preferably in accordance with the stored amplitude. The received signal is subsequently monitored for variations that result in a threshold crossing indicating the unwanted presence of a person in a danger zone. When a threshold crossing is detected an alarm is activated.

27 Claims, 8 Drawing Sheets

VEHICLE ALARM APPARATUS AND METHOD FOR PREVENTING INJURY TO NEARBY PERSONS

BACKGROUND OF THE INVENTION

This invention relates to alarm systems for motor vehicles which prevent injury to nearby persons. More specifically, this invention relates to school bus alarm systems which warn a driver of the bus if a child is in danger of being injured when the bus starts moving.

Children are frequently injured at school bus stops, typically when boarding or deboarding the bus. Statistics maintained by the Fatal Accident Reporting System, for example, show that approximately 300 children are so injured—many fatally—in the United States per year. The injuries occur when a driver pulls away from the stop and is not aware that a child is in a zone near the bus that presents a high risk of injury. The zones beneath the bus as well as immediately in front of and behind the bus are blind spots for the driver of most buses and, therefore, the most dangerous areas.

Existing vehicle alarm systems typically transmit a signal in the danger zone and analyze the resulting received signal to detect doppler shifts which indicate a moving person near the motor vehicle. These systems, however, are difficult to use once the vehicle in which they are installed starts moving. For example, if a doppler effect system is monitoring the space beneath a slowly moving school bus whereinto a child has just moved, then the received signal will include a first doppler component resulting from ground reflections and a second doppler component resulting from the person's presence. These doppler components in the received signal should be separated for the alarm to be effective when the bus is moving. Doppler systems can also have limited coverage due to colocation of the transmit and receive antenna.

SUMMARY OF THE INVENTION

The present invention provides apparatus and method for detecting the presence of a person near a vehicle. In accordance with a preferred embodiment, an energy field is established near the vehicle in zones of high risk and a signal is received as a result. An amplitude of the received signal is monitored for amplitude variations across one or more thresholds. In accordance with a preferred embodiment, the thresholds are set in accordance with the amplitude of the received signal when no person is present near the vehicle. In a most preferred embodiment, two sets of dual thresholds are used. The first set is used, for example, when the vehicle stops. The second set is preferably wider than the first set and is used some time later, for example, when the vehicle begins to move. Any threshold crossings are indicated with an alarm.

DESCRIPTION OF THE PREFERRED EMBODIMENTS

The present invention detects the presence of persons in high risk zones near a vehicle by transmitting an energy field around and beneath the vehicle. The amplitude of the field is monitored by one or more receivers to detect any disturbances therein. Any disturbance in the field indicates the presence of a person in a high risk zone. In the event a disturbance is detected, the driver of the vehicle is warned, thereby increasing the possibility of avoiding an accident. The present invention is particularly advantageous when used on a school bus.

Figure 1:
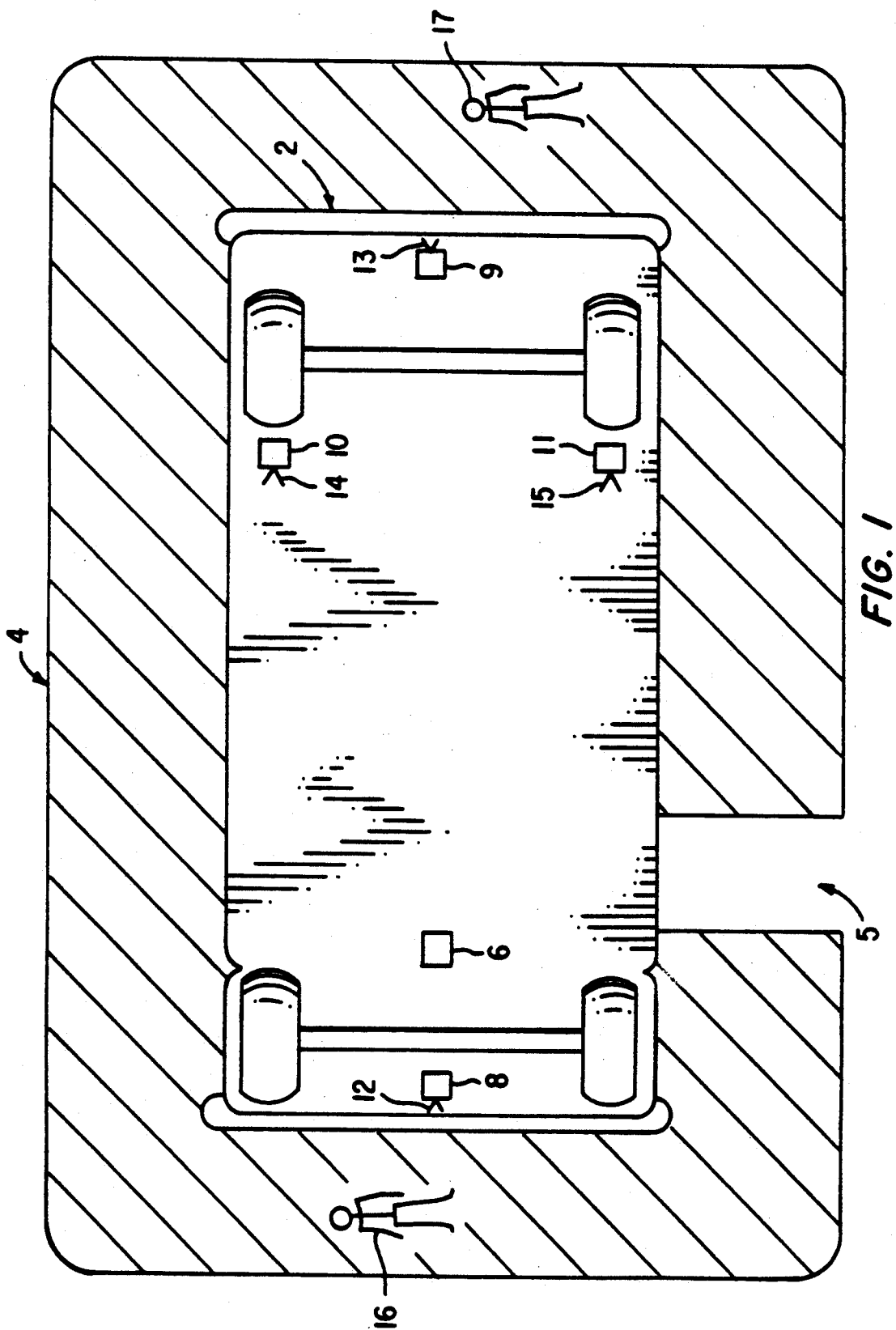
FIG. 1 illustrates the undercarriage of a school bus, the danger zone and the layout of components in accordance with a preferred embodiment of the present invention.

FIG. 1 illustrates a bottom view of a school bus 2 and the zone 4 which are blind spots for a driver of the bus 2 and, therefore, the most dangerous zone for children. Generally, the zone 4 extends ten feet from the bus 2 as well as underneath the bus 2 (as indicated by the dashed lines). The area 5 is not blind to the driver when the bus 2 stops and a door to the bus 2 opens.

The present invention preferably includes a transmitter 6 and four receivers 8 to 11. The transmitter 6 is preferably located beneath the bus 2 inside a perimeter formed by the four receivers 8 to 11 and creates the desired energy field underneath the bus 2 and in the zone 4. The transmitter 6 preferably establishes the energy field by transmitting pulsed microwave or millimeter wave energy, however, the energy field can be created by any form of acoustic or electromagnetic energy.

There is limited volume between the undercarriage of the bus 2 and the ground. It is, therefore, preferred that the beam width of the transmitter 6 in elevation be less than 50°. It is also preferred that the beam width of the transmitter 6 in elevation be greater than 5° to ensure the establishment of a minimum energy field. For large school buses, the beam width in elevation is preferably 30°.

The transmitter 6 can be designed to transmit in all directions along the azimuth. In a school bus 2, however, to minimize system cost, to increase system sensitivity and to provide coverage of the most dangerous portions of the zone 4, it is preferred that the transmitter 6 send a signal having a 90° beam width in azimuth toward the front of the bus 2 as well as toward the rear of the bus 2.

The four receivers 8 to 11 can be identical and are each preferably located as illustrated underneath the bus 2. The first receiver 8 is located near the front of the bus 2 and directionally receives energy reflected from a person 16 located in the portion of the zone 4 to the front of the bus 2 through an antenna 12. The second receiver 9 is located toward the rear of the bus 2 and directionally receives energy reflected from a person 17 located in the portion of the zone 4 to the rear of the bus 2 through an antenna 13. The third 10 and fourth 11 receivers are located on the sides of the bus 2, preferably just in front of the rear tires. The third 10 and fourth 11 receivers directionally receive direct and reflected energy through the antennas 14 and 15, respectively, from the portions of the zone 4 to the side of the bus 2 and from underneath the bus 2.

To improve sensitivity, each of the receivers 8 to 11 and their associated antennas 12 to 15 preferably receive signals from limited directions. It is preferred that the direction of reception in elevation and in azimuth be selected from angles in a range of 5° to 50°. For large school buses, for example, it is preferred that the energy field that approaches within a 30° by 30° (elevation by azimuth) solid angle be received.

The above-described transmission and reception does not provide full coverage of the danger zone 4, however, system sensitivity is improved and the most dangerous portions of the zone 4 are covered. The coverage of the zone 4 is determined by the intersection of the transmitted beam and the solid angle of reception, that is by the intersection of the transmitter and receiver antenna beam patterns. If alternative coverage is required, then alternate transmitted beam widths or angles of reception can be selected, or more or less receivers can be used, or more transmitters can be used. For example, if the undercarriage of the bus 2 is so crowded that the energy field is substantially interfered with, additional transmitters can be used.

Generally, the operation of the present invention is as follows. The transmitter 6 establishes an energy field in portions of the zone 4. Each of the receivers 8 to 11 will receive a signal as a result of the energy field. The received signals are added and averaged and an amplitude is determined at a time when no persons are present near the bus. The amplitude is representative of the energy field when there is no danger. Subsequently, the processed received signal is monitored for variations in amplitude which cross one or more thresholds. If a threshold crossing is detected, then an alarm is set.

Note that each received signal can be individually monitored for amplitude variations, however, this would require a significant increase in circuitry. Also note that if only a single receiver is used, the summing circuitry is not necessary.

Figure 2:
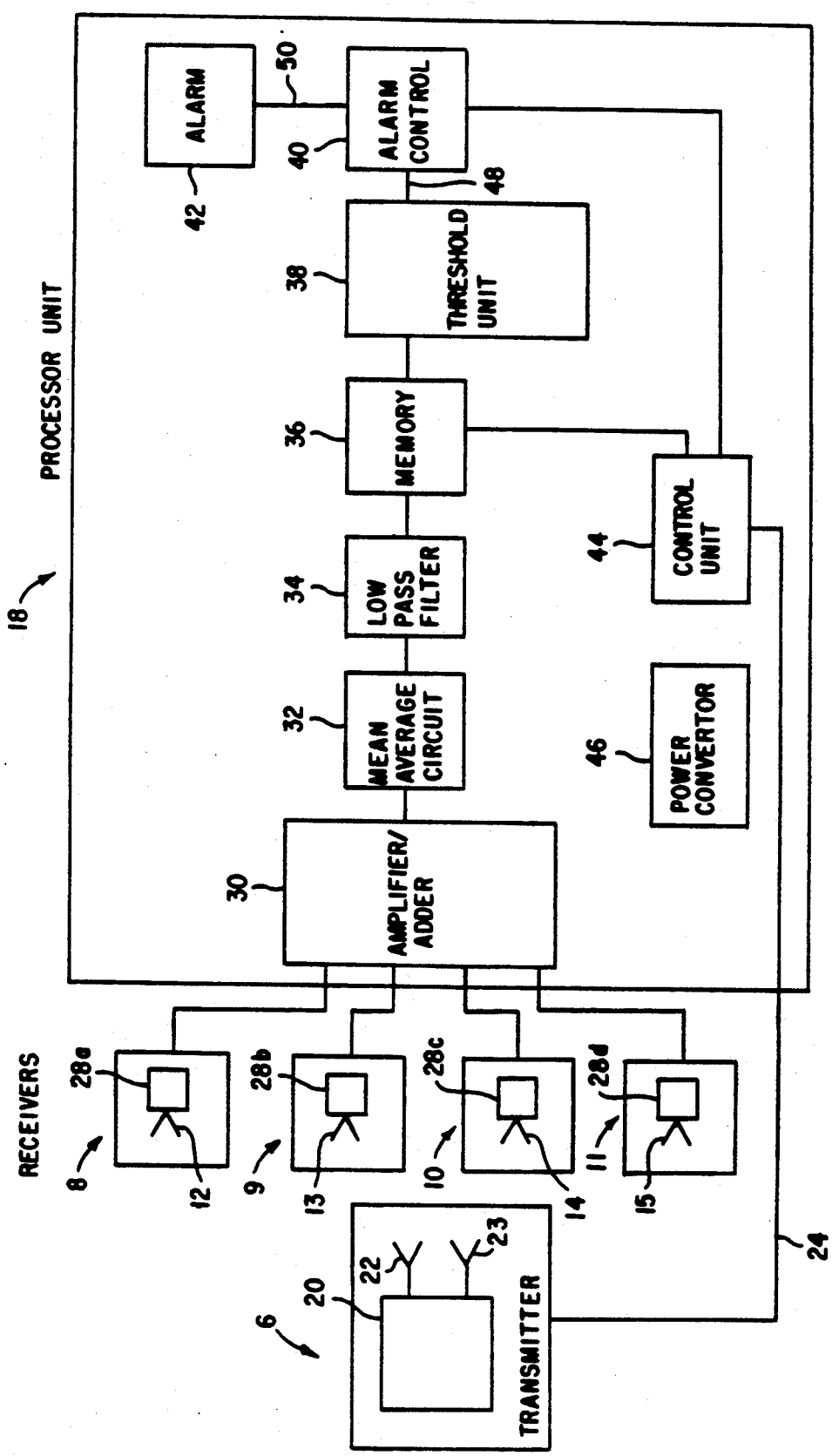
FIG. 2 is a block diagram of a preferred embodiment of the invention.

FIG. 2 illustrates a preferred block diagram of the electronics of the present invention which includes the transmitter 6, the four receivers 8 to 11 and the Processor unit 18. The transmitter 6 preferably includes a pulsed microwave source 20 and antennas 22 and 23. The first antenna 22 provides the preferred beam pattern to the front of the bus 2 and the second antenna 23 provides the preferred beam pattern to the rear of the bus 2, although any arrangement of sources 20 and antenna can be used to provide desired coverage. The source 20 preferably provides 250 mW peak at 10.525 GHz with a 3% duty cycle. An example of a preferred pulsed microwave source 20, well known to one skilled in the art, is a waveguide package including a Gunn diode mounted in a packaged resonant cavity and having a low pass bias filter. The antennas 22 and 23 preferably have apertures of 0.7 inches in the azimuth plane and 2.6 inches in the elevation plane.

The transmitter 6 can continuously transmit pulsed energy, however, it is preferred to enable and disable the transmitter 6 output so that the energy field is established only when needed. The transmitter 6 can be enabled, by way of example only, when the bus 2 stops, when a door to the bus 2 opens, or when the speed of the bus 2 falls below a predetermined value. Once transmission starts, the transmitter 6 can be disabled, by way of example only, a predetermined time after being enabled, after the speed of the bus 2 has reached a predetermined value or never such that continuous transmission is obtained. The processor unit 18 monitors the necessary parameter which is selected to control the transmission and appropriately enables and disables the transmitter 6 over one or more wires 24. For large school buses, it is preferred to enable transmission when the door to the bus 2 opens and to disable transmission a predetermined time after the door closes. The predetermined time is preferably 10 seconds.

Each of the receivers 8 to 11 preferably are identical and include a directional antenna 12, 13, 14 and 14, respectively and a crystal detector 28a, 28b, 28c, and 28d, respectively. The antenna aperture is preferably 2.6 detector 28 is the MA/COM Detector 86560 which operates at 10.525 GHz. The output from each of the receivers 8 to 11 is fed to the processor unit 18. Note that all elements in the receivers 8 to 11 are passive, thereby requiring no vehicle voltage.

The processor unit 18 preferably includes an amplifier/adder 30, a mean average circuit 32, a low pass filter 34, a memory 36, a threshold unit 38, an alarm control 40, an alarm 42, a control unit 44 and a power converter 46. Each of the receivers 8 to 11 sends the signal it receives as a result of the energy field established by the transmitter 6 to the amplifier/adder 30. The amplifier/adder 30 preferably amplifies each of the received signals, sums the amplified signals and then amplifies the resulting sum.

The resulting sum is input to the mean average circuit 32. This circuit rectifies and averages the amplified sum signal over time. The averaging is necessary to process the preferred pulsed transmissions. If continuous wave (CW) transmission is utilized, then the averaging is not needed. CW transmission, however, generally is not feasible. A rectified signal is sent to the low pass filter 34. The low pass filter 34 further amplifies and eliminates high frequency components of the rectified signal. The output of the low pass filter 34, therefore, indicates the total amount of energy received by all of the receivers 8 to 11.

The output of the low pass filter 34 is sent to the memory 36 and to the threshold unit 38. The memory 36 under control of the control unit 44 samples and stores the amplitude of the signal from the low pass filter 34 at a predetermined time to determine the amount of energy received by all receivers 8 to 11 when a person is not in an area of high risk near the bus 2. The sampling is done after the transmitter 6 has reached steady state operation. In a preferred embodiment where the transmitter 6 is enabled when the door to the bus 2 opens, the sample is taken and stored by the memory 36 one second after the door opens. A new sample of the amplitude is taken and stored each time the bus door is opened.

The stored sample from the memory 36 is input to the threshold unit 38 where a threshold or thresholds about the stored amplitude are selected. The threshold unit 38 also receives the output from the low pass filter 34 which is the instantaneous averaged energy received by the receivers 8 to 11. The threshold unit 38 continuously compares the instantaneous received energy from the low pass filter 34 with the thresholds generated in response to the output of memory 36. A variation in the instantaneous received energy across a previously established threshold causes a signal to be sent to the alarm control 40 on a line 48.

If the alarm control 40 receives the signal when enabled by the control unit 44, the alarm 42 is activated by a signal on a line 50. The alarm 42 is preferably audio and visual to ensure that the driver is alerted to the danger.

The power converter 46 converts power from the bus electrical system to a useful form for the alarm system of the present invention.

It is preferred that the thresholds be selected by the threshold unit 38 in accordance with the stored amplitude at each stop of the bus 2. The thresholds, therefore, are adaptive so that alarms in accordance with a preferred embodiment of the present invention are more tolerant of variations in terrain, in external conditions and in component performance variations.

The number of thresholds used by the threshold unit 38 depends on the transmitter/receiver configuration. If the transmitter/receiver arrangement is such that the receivers only receive energy reflected by a person in an area of danger, then only a single threshold above the stored amplitude is preferred because the amplitude of the instantaneous received signal will only increase when the person is in the area of danger. On the other hand, if the transmitter/receiver arrangement is as in FIG. 1 wherein the receivers 10 and 11 can receive energy directly from the transmitter 6 as well as reflected energy, then a threshold above the stored amplitude and a threshold below the stored amplitude is preferred to determine if a person is in the zone of danger. Generally, the threshold below the stored amplitude will be crossed if a person enters the zone 4 so as to disrupt direct transmissions from the transmitter 6 to the receivers 10 or 11 while the threshold above the stored amplitude will be crossed if a person enters the zone 4 and reflects energy to the receiver 10 or 11 without disrupting direct transmission.

It is further preferred to change the threshold or thresholds after some time to permit greater variation in the amplitude of the instantaneous received signal before activating the alarm 42. For example, if a first threshold which is above the stored amplitude and a second threshold which is below the stored amplitude are being used, then it is preferred to increase the first threshold and to decrease the second threshold to a third and a fourth threshold, respectively, to permit greater variations in the amplitude of the instantaneous received signal above and below the stored amplitude. The sensitivity of the alarm is thereby decreased. This is particularly advantageous in vehicle alarms when the vehicle begins to move. For example, when the vehicle begins to move, the situation in which the amplitude was sampled changes, so the reliability of the sample also changes. The decrease in reliability is accounted for by permitting a wider range of amplitude variations. For example, the amplitude is preferably sampled a predetermined time after the door to the bus 2 opens when the bus 2 is stopped. Once the bus 2 starts to move again, the varying terrain could cause greater amplitude fluctuations without a person entering the danger zone 4. As such the two sets of thresholds permits closer monitoring of the zone 4 when the bus 2 is stopped and it decreases the sensitivity of the alarm to prevent excess false alarms when the bus 2 is moving. Note that if only a single threshold is used, then that threshold is adjusted up or down as appropriate.

Figure 3:
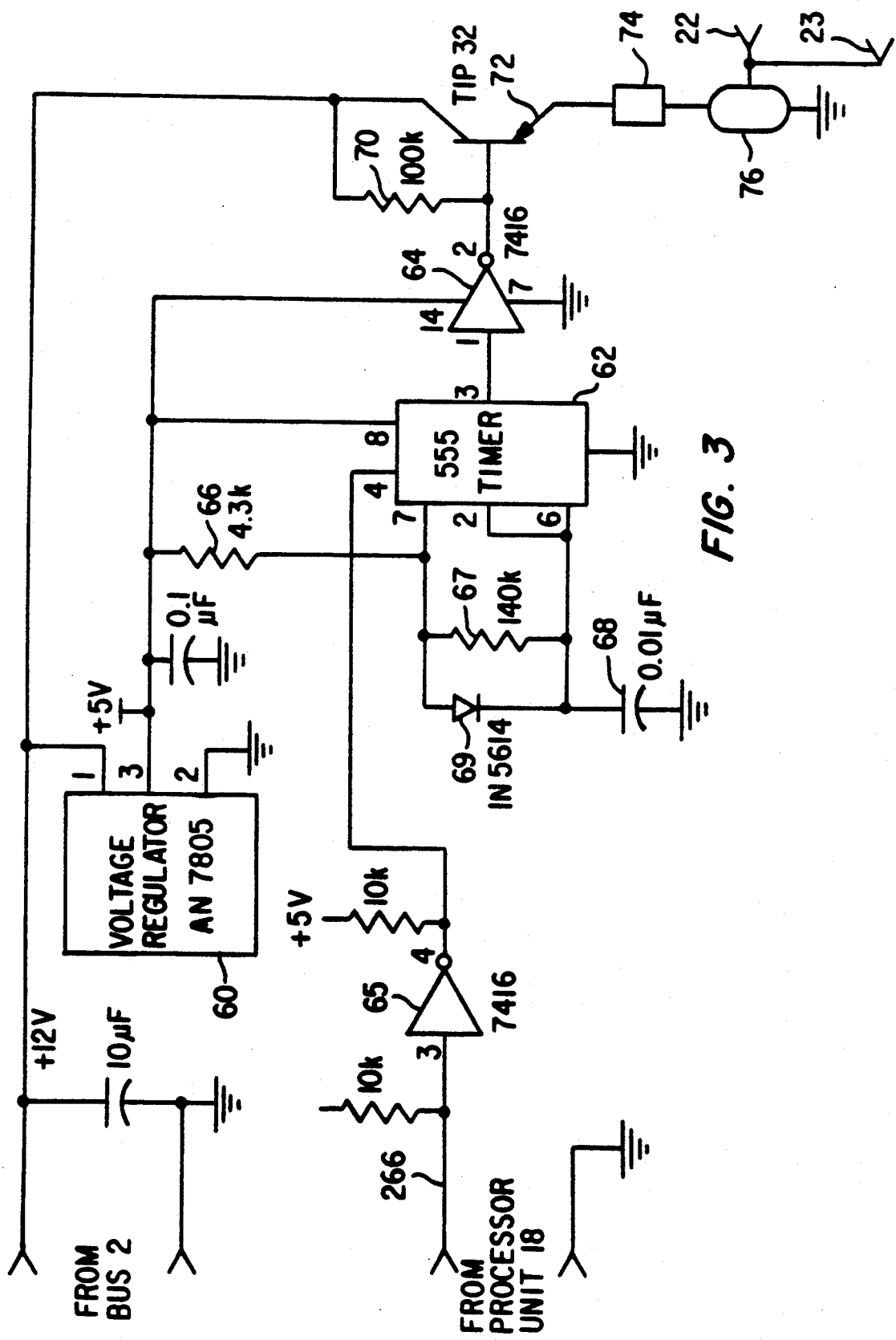
FIGS. 3 to 9 illustrate a preferred schematic diagram of the present invention.

FIGS. 3 to 10 illustrate a preferred schematic diagram of the vehicle alarm of the present invention. In FIG. 3, the transmitter 6 is illustrated. A voltage regulator 60 converts vehicle voltage to 5 volts for use by a monostable multivibrator 62 and inverters 64 and 65. The processor unit 18 supplies a control input through the inverter 65 to enable and disable the monostable multivibrator 62. In a preferred embodiment, the control input is enabled when the door to the bus 2 opens to enable transmission and is disabled 10 seconds after the door is closed to disable transmission.

Figure 4:
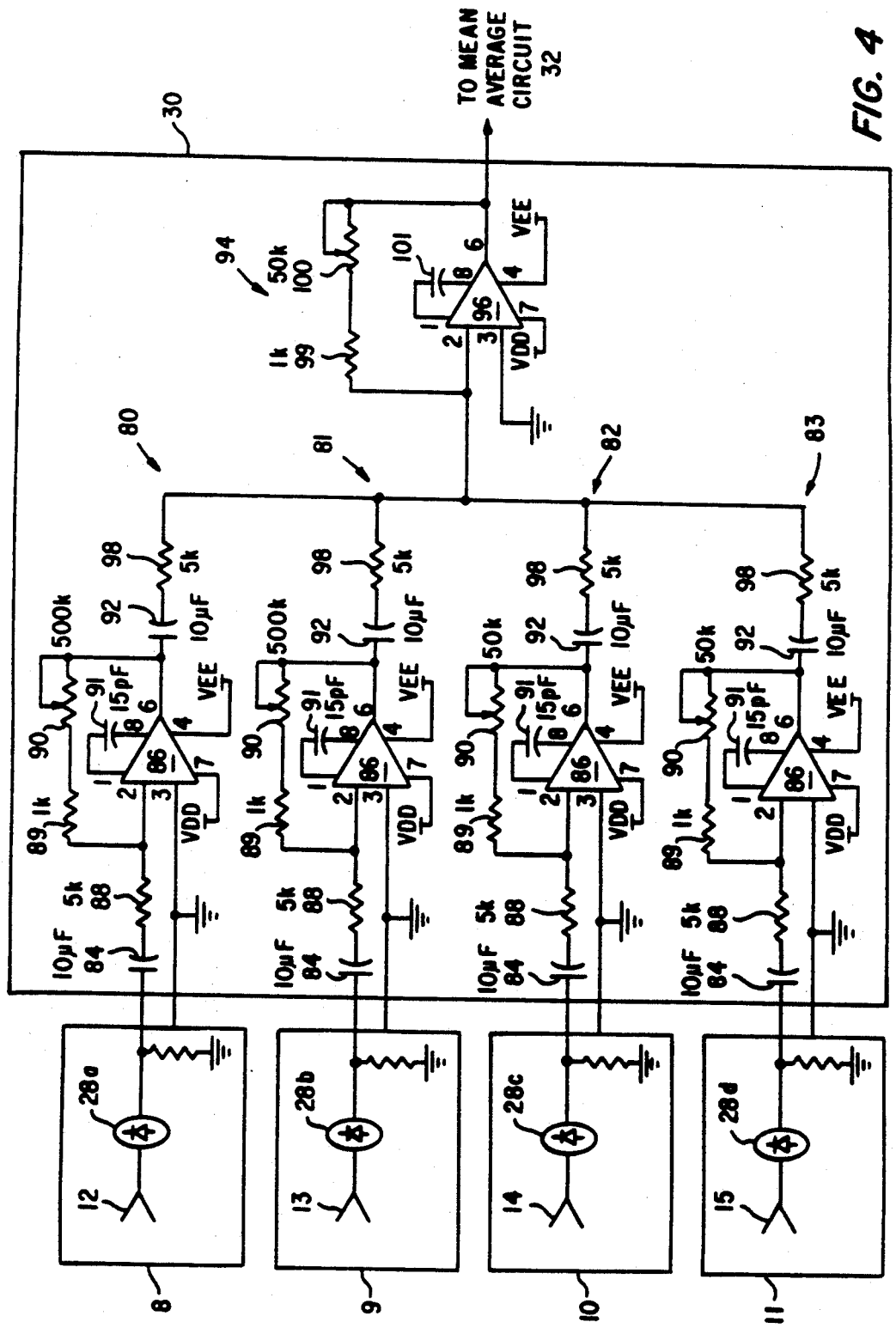

Two resistors 66 and 67, a capacitor 68, and a diode 69 are interconnected between power, ground and the monostable multivibrator 62 to cause a pulsed output at the multivibrator 62 which transitions from HIGH to LOW to HIGH and is sent through the inverter 64 when the control signal is enabled. A resistor 70 pulls up the open collector output of the inverter 64. Current then flows through the transistor 72, through a slow blow fuse 74, and through a Gunn diode 76 in the microwave source 20 so that the antennas 22 and 23 transmit an electromagnetic field to portions of the zone 4. In a preferred embodiment, the pulsed output has a three percent duty cycle and is transmitted at a 1 KHz rate. The pulsed signal is preferred to minimize average radiated power while at the same time maintaining a peak power level that permits using inexpensive detector diodes in the receivers. 5 FIG. 4 illustrates a preferred schematic of the receivers 8 to 11 and the adder/amplifier 30. In a preferred embodiment, the energy received by the antenna 12 to 15 in each receiver 8 to 11 will consist of a portion of the pulse stream transmitted by the transmitter 6. The received energy is input to a detector 28 to extract the envelope of the pulse stream. The receivers 8 to 11 send the pulse stream envelope to the respective input channel 80 to 83 of the amplifier-/adder 30.

Each input of the amplifier/adder 30 is AC coupled by a capacitor 84. Each input is amplified by an amplifier 86 whose gain is set by three resistors 88 to 90. The resistor 90 is preferably a potentiometer so that the gain between the channels 82 and 83 as well as the gain between the channels 80 and 81 can be balanced. Note that the resistor 90 is set at a higher level in channels 80 and 81 than in channels 82 and 83, so that channels 80 and 81 have a higher gain. This is preferred since the alarm condition signal received by the receivers 8 and 9 is reflected and, therefore, much lower. The amplifier 86 in each channel 80 to 83 preferably has a frequency compensation capacitor 91.

The output of each channel 80 to 83 is AC coupled through a capacitor 92 to a summing circuit 94. The summing circuit includes an amplifier 96 whose gain is set by a resistor 98 in each channel 80 to 83 and by two resistors 99 and 100. The resistor 100 is preferably a potentiometer to adjust the gain of the signal input to the mean average circuit 32. The amplifier 96 also has a frequency compensation capacitor 101.

Figure 5:
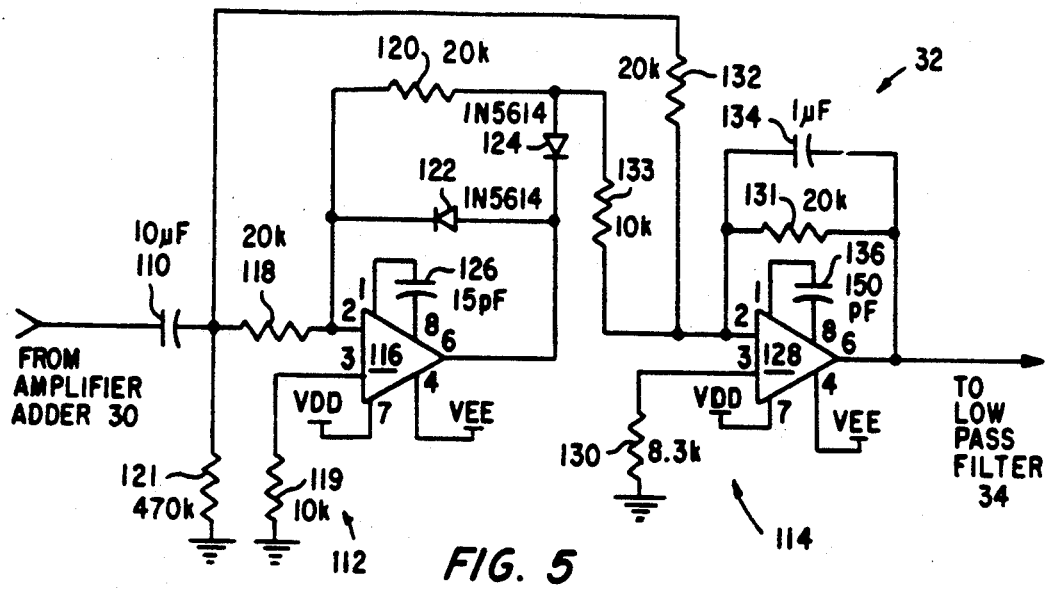

FIG. 5 illustrates a preferred mean average circuit 32. The output of the amplifier/adder 30 is AC coupled to the mean averaging circuit 32 by a capacitor 110. The mean average circuit 32 includes a rectifying circuit 112 and an integrating circuit 114. The rectifying circuit includes an amplifier 116, associated resistors 118 to 121, two diodes 122 and 124 and a capacitor 126. The integrating circuit includes an amplifier 128, four resistors 130 to 133, an integrating capacitor 134 and a frequency compensating capacitor 136. Circuits of this type are well known to one skilled in the art, and can be found in publications such as "Operational Amplifiers and Linear Integrated Circuit 2nd Edition", at pages 144 to 147, by R. Coughin and F. Driscoll, published by Prentice Hall, 1982.

Figure 6:
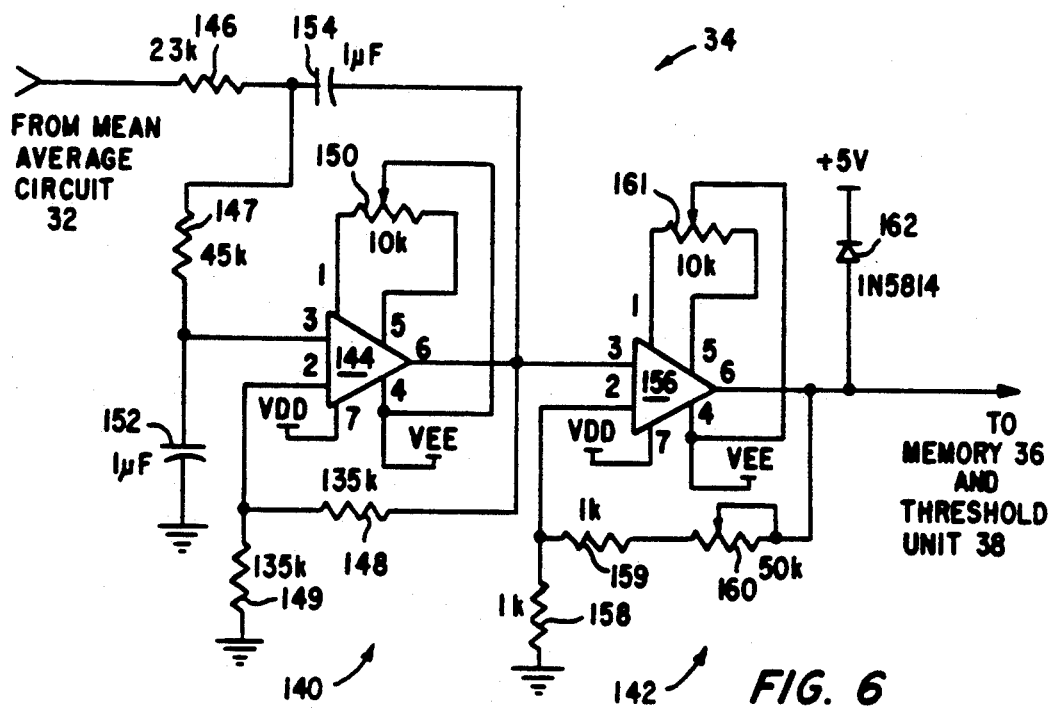

FIG. 6 illustrates a preferred low pass filter 34 which receives the output of the mean average circuit 32 and is used to suppress AC noise and high frequency components associated with the output of the mean average circuit 32 as well as engine vibration modulation. The low pass filter 34 includes a filtering stage 140 and a gain stage 142.

The filtering stage 140 includes an amplifier 144, associated resistors 146 to 150 and associated capacitors 152 and 154. In a preferred embodiment, the resistors and capacitors are selected to produce a Butterworth low pass filter with a gain of 2, and a cutoff frequency of 5 Hz. The resistor 150 is preferably a potentiometer used to null offset voltages appearing at the output of the amplifier 144.

The gain stage 142 includes an amplifier 156 and associated resistors 158 to 161. The resistor 160 is preferably a potentiometer used to adjust the gain of amplifier 156. The resistor 161 is preferably a potentiometer used to null offset voltages appearing at the output of the amplifiers 156. A diode 162 clamps the output of the amplifier 156 to 5 volts to protect the memory 36. The output of the low pass filter 34 is representative of the amplitude of the total energy reeceived by the receivers 8 to 11.

Figure 7:
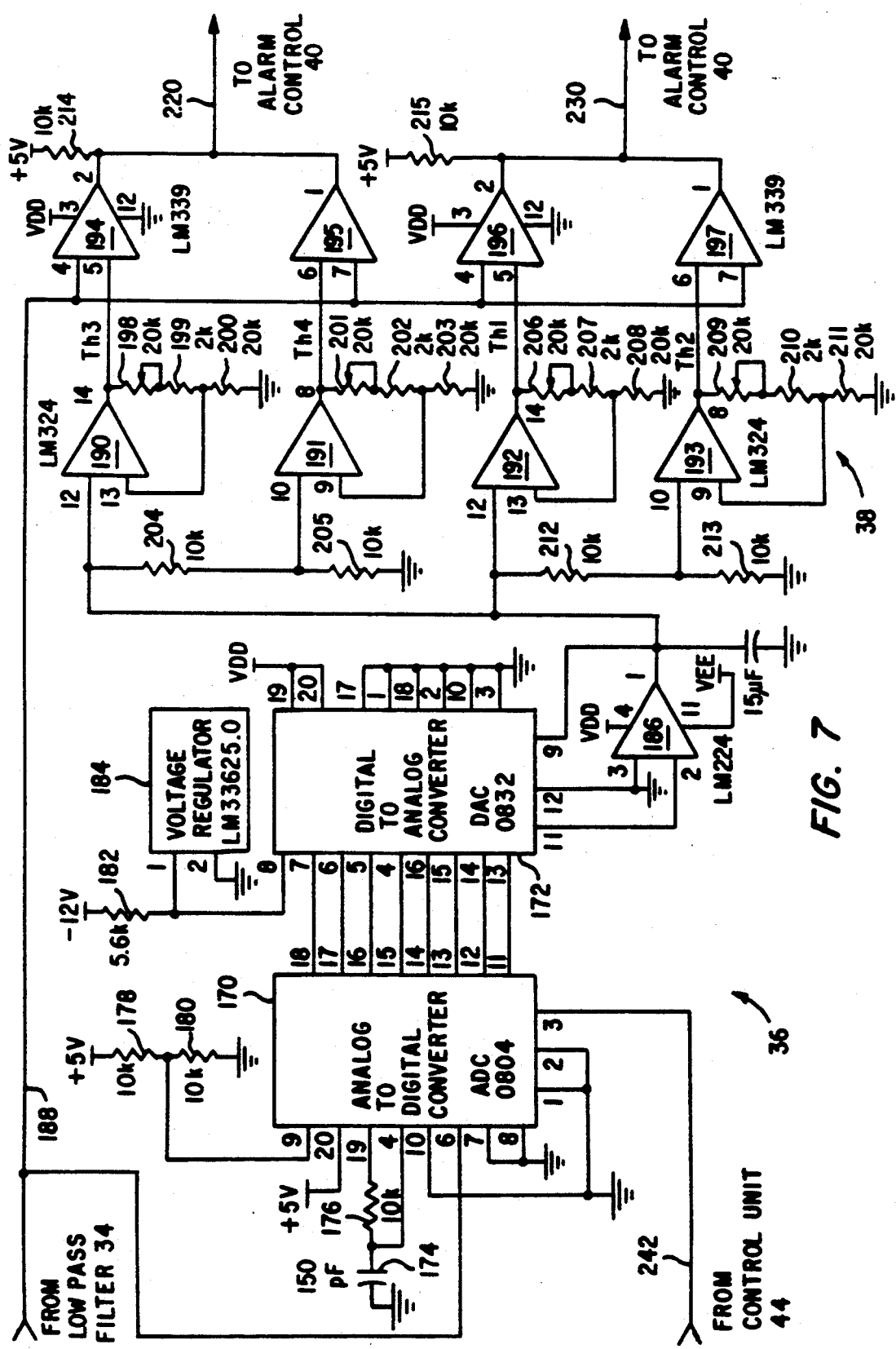

FIG. 7 is a preferred schematic of the memory 36 and the threshold unit 38. The memory 36 includes an analog to digital converter (ADC) 170 and a digital to analog converter (DAC) 172. A resistor 176 and a capacitor 174 determine the clock rate at which ADC 170 performs the conversion. A clock rate of approximately 600 KHz is preferred. Two resistors 178 and 180 provide a voltage reference for the ADC 170. A resistor 182 and a voltage regulator 184 provide a negative voltage reference for the DAC 172. The output of DAC 172 is buffered through an amplifier 186.

The memory 36 receives an input from the low pass filter 34 on the line 188 which is representative of the amplitude of the total received energy. The ADC 170 samples the input from the low pass filter 34 under control of a signal on the line 242 from the control unit 44. The sample is stored in the DAC 172 and is available at the output of the amplifier 186. In a preferred embodiment, the sample is taken and stored a predetermined time after the transmitter 6 is enabled which allows the transmitter 6 and other circuitry to reach steady state operation before a sample is taken. The delay in sampling, however, must be short enough so that children do not enter the zone 4 until the sample is taken. In a preferred embodiment, the delay is one second. The sample, therefore, establishes a reference amplitude of the energy field with no one present. A new sample is preferably taken each time the bus 2 stops to take on or discharge passengers and is stored until the alarm system is deactivated a predetermined time after the door closes.

The threshold unit 38 is preferably an analog comparison circuit which includes four amplifiers 190 to 193 and four comparators 194 to 197 and associated resistors 198 to 215 arranged to produce four thresholds in accordance with the amplitude stored by the ADC 170 and DAC 172. The first set of thresholds (Th1 and Th2) are used just after the sampling and storing of the amplitude, for example, when the bus 2 is stopped. They permit a narrow range of amplitude variations and, therefore, a relatively high sensitivity level. The second set of thresholds (Th3 and Th4) is used at a later time, for example, when the bus 2 starts to move or after a predetermined time. The last two thresholds provide for a wider range of variations and, therefore, decrease the sensitivity of the alarm system, as before described.

The first set of two thresholds are selected by the amplifiers 192 and 193. The amplifier 192 selects the first threshold by multiplying the stored sample by the gain of the amplifier 192 as set by the resistors 206 to 208. The gain is preferably selected from a number in the range of 1.0 to 1.2. The first threshold is, therefore, above the stored amplitude. In a most preferred embodiment, the gain of the amplifier 192 is 1.1.

The amplifier 193 selects the second threshold by multiplying the stored amplitude by the gain of the amplifier 193 as set by the resistors 209 to 213. The gain is preferably selected from a number in the range of 0.8 to 1.0. The second threshold is, therefore, below the stored amplitude. In a most preferred embodiment, the gain of the amplifier 193 is 0.9. The potentiometers 206 and 209 are used to adjust the thresholds.

The second set of two thresholds are selected by the amplifiers 190 and 191. The amplifier 190 selects the third threshold by multiplying the stored sample by the gain of the amplifier 190 as set by the resistors 198 to 200. The gain is preferably selected from a number in the range of 1.2 to 2.0. The third threshold is, therefore, above the first threshold as well as the stored amplitude. In a most preferred embodiment, the gain of the amplifier 190 is 1.5.

The amplifier 191 selects the fourth threshold by multiplying the stored amplitude by the gain of the amplifier 191 as set by the resistors 201 to 205. The gain is preferably selected from a number in the range of 0.25 to 0.8. The fourth threshold is, therefore, below the stored amplitude. In a most preferred embodiment, the gain of the amplifier 193 is 0.5. The potentiometers 198 and 201 are used to adjust the thresholds.

The first through fourth thresholds as determined by the amplifiers 190 to 193, respectively, are output to a first input of the comparators 194 to 197, respectively. The second input of the comparators 194 to 197 receives the instantaneous averaged amplitude of the received signals from the low pass filter 34. The comparators 194 to 197 detect when the instantaneous averaged amplitude of the received signals exceeds or goes below a respective threshold. For example, the comparators 196 and 194 determine if the instantaneous averaged amplitude of the received signal rises above the first and third thresholds, respectively. The comparators 197 and 195 determine if the instantaneous averaged amplitude of the received signal falls below the second and fourth thresholds, respectively.

The outputs of the comparators 196 and 197 are preferably used when the bus 2 is not moving while the outputs of the comparators 194 and 195 are preferably used when the bus 2 is moving. Since a threshold crossing above or below the stored amplitude indicates a potentially dangerous situation and results in a low signal on the respective comparator 194 to 197, the output of each of the comparators 196 and 197 are wire ORed and sent to the alarm control 40 as are the outputs of the comparators 194 and 195. A potentially dangerous situation, therefore, is indicated by a low on line 220 or on line 230.

Figure 8:
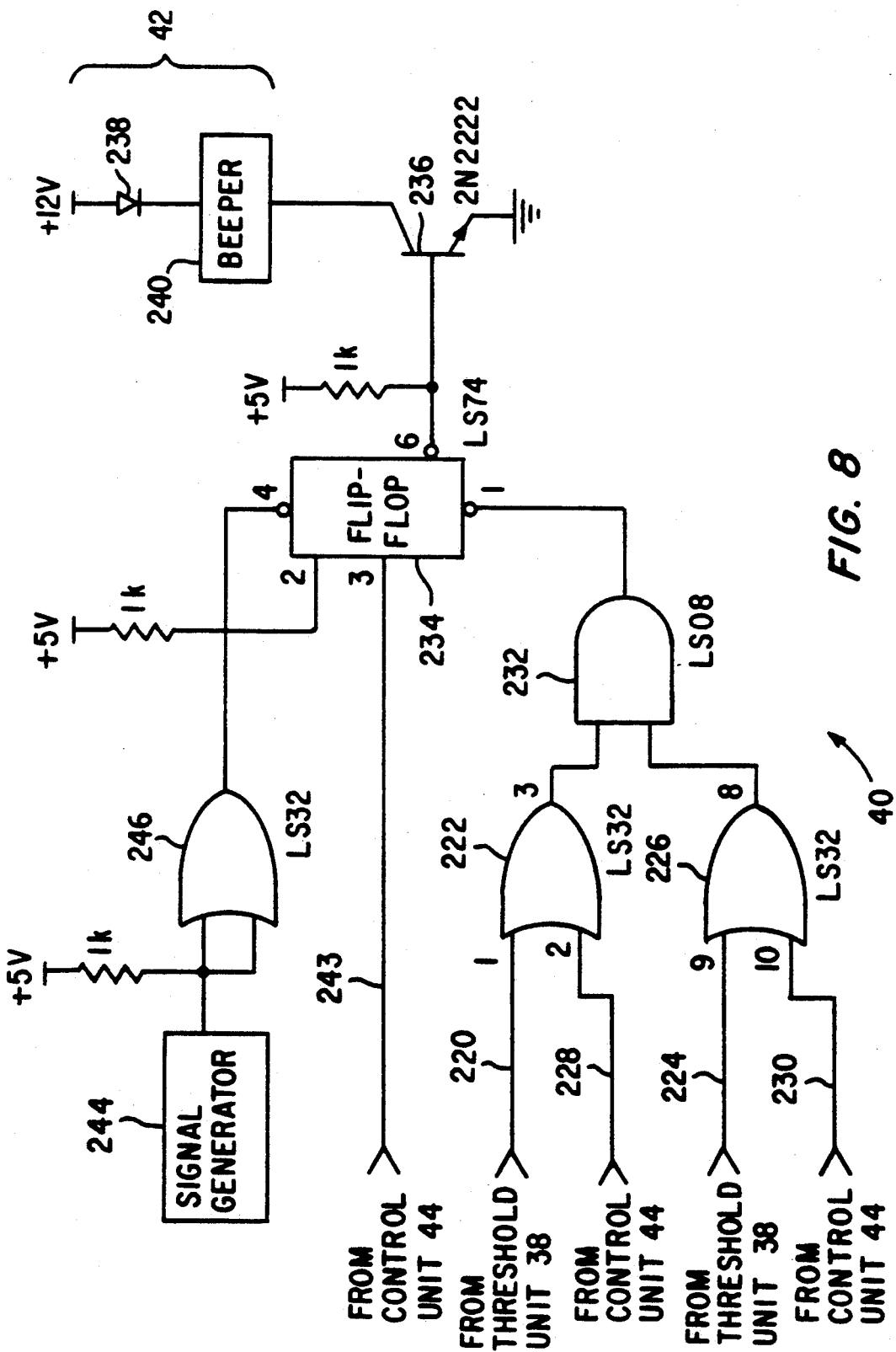

FIG. 8 illustrates a preferred schematic of the alarm control unit 40 and alarm 42. The alarm control unit 40 enables the outputs from the threshold unit 38 at the appropriate times to enable the alarm 42 if a threshold crossing occurs.

The output from the comparators 194 and 195 is received on a line 220 and input to a gate 222 and the output from the comparators 196 and 197 is received on a line 230 and input to a gate 226. The inputs from the control unit 44 are received on lines 228 and 224 to enable one or both of the inputs from the threshold unit 38.

When the gates 222 or 226 are enabled indicating a dangerous situation exists, a gate 232 is also enabled so that its output is a low signal that causes a flip-flop 234 to turn on a transistor 236 so that the alarm 42 is activated. The alarm 42 preferably includes a LED 238 in series with a piezoelectric beeper 240 to provide audio and visual stimulus to the driver of the bus 2 during potentially dangerous situations.

The flip-flop 234 is initialized by a signal on a line 243 from the control unit 40. In a preferred embodiment, the signal on the line 243 sets the flip flop 234 to a condition that resets the alarm 42 at approximately one second after the door to the bus 2 opens. This provides sufficient time for the transmitter output to stabilize and for the systems to begin monitoring dangerous situations.

In addition, the flip-flop 234 is set to a non-alarm condition by a signal generator 244 which periodically sends a signal through a gate 246. The signal generator 244 provides a convenient way to deactivate the alarm 42 after a person is no longer in the zone 4. In a preferred embodiment, the signal generator 244 sets the flip-flop 234 in a non-alarm condition approximately every 0.1 seconds.

Figure 9:
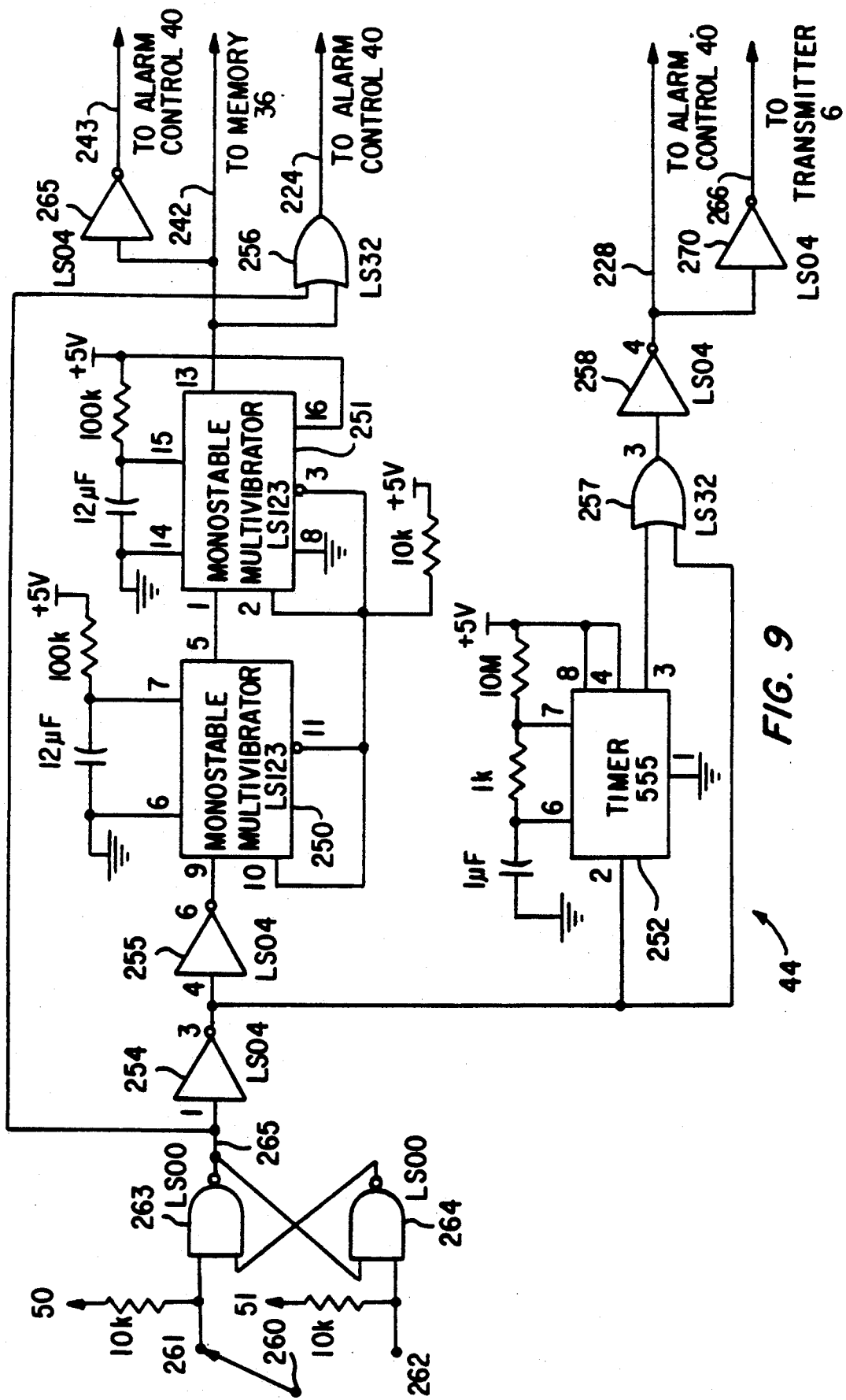

FIG. 9 illustrates a preferred schematic diagram of the control unit 44 which produces control signals for the transmitter 6, for the memory 36 and for the alarm control 40.

The control unit 44 monitors a switch 260 which indicates the status of the door to the bus 2. The switch 260 is connected to input 261 if the door is closed and connected to input 262 if the door is open. Two gates 263 and 264 are connected in a standard debouncing circuit to the switch 260. When the door to the bus 2 opens, there is a high to low transition at a line 265, and when the door closes there is a low to high transition at the line 265. The resistors and capacitors associated with the monostable multivibrators 250 and 251 are selected so that active high timing pulses having a pulse width of 0.5 seconds are generated in response to the high to low transitions at their respective inputs. The resistors and capacitors associated with the timer 252 are selected so that an active high timing pulse having a pulse width of approximately 10 seconds is generated in response to the high to low transition at its input (when the door is closed).

The output from the monostable multivibrator 251 on the line 242 is output to the memory 36 (FIG. 6) and is inverted by a gate 265 and output to the alarm control 44 (FIG. 8). The signal on the line 242 remains low until approximately 0.5 seconds after the door opens, then changes to a high level signal for approximately 0.5 seconds, and then returns to a low. This signal on the line 242 causes the memory 36 to sample a signal representative of the signal energy received by the receivers 8 to 11 when no persons are present in the zone 4, as previously discussed. The signal on line 243 resets the alarm 42 one second after the door is opened, as previously discussed.

The signal on the line 224 from the gate 256 is output to the alarm control 40 to enable the use of the first set of narrower thresholds at an appropriate time. This signal preferably remains high until the door opens, and then drops to a low level for approximately 0.5 seconds, returns to a high level for approximately 0.5 seconds, and then returns to a low level until the door closes.

The signal on the line 228 from the gate 258 is output to the alarm control 40 to enable the use of the second set of thresholds at an appropriate time. This signal goes low when the door opens and remains so until ten seconds after the door closes. The signal on the line 228 is inverted by a gate 270 to produce a signal used to control the enablement of the transmitter 6.

While FIGS. 3 to 9 illustrate preferred schematics for the present invention, however, many alternate embodiments are possible, for example, the use of less thresholds. Furthermore, if adaptive thresholds are not necessary for the performance of the alarm, then the threshold or thresholds to which the received signal is compared can be predetermined. In this case, the memory 36 and the front end of the threshold detector 38 are not needed. The threshold can be set by a voltage divider network which is input to the comparator instead of by the amplifiers 190 to 193.

The vehicle alarm as previously described wherein the amplitude of an established energy field is monitored from threshold variations can easily be combined with existing doppler based systems that monitor received signals for frequency shifts. Since doppler based systems on moving vehicles do not function well when located in close proximity of the ground or when they are downward looking, the incorporation of the present amplitude monitoring alarm would significantly improve the functioning of such doppler based systems. By way of example only, the signal or signals received could be monitored for frequency variations when the bus 2 is stopped and then for amplitude variations when the bus 2 begins to move. As another example, the signal or signals received could be monitored for frequency variations for a first predetermined period of time and thereafter for amplitude variations.

We claim;

1. An alarm for a vehicle, comprising:
transmitter means adapted for connection to the vehicle for establishing an energy field near the vehicle in a danger zone;
receiver means adapted for connection to the vehicle for receiving a signal as a result of said energy field;
processor means connected to said receiver means for determining an amplitude of said signal when no object is present in said danger zone, for determining a first threshold in accordance with and above said determined amplitude, for determining a second threshold in accordance with and below said determined amplitude, and for monitoring said signal for any amplitude variations either above said first threshold or below said second threshold which occur when the person or object enters said energy field; and
alarm means connected to said processor means for indicating a threshold crossing.

2. The alarm as claimed in claim 1, wherein said threshold crossing indicates the presence of an object in said danger zone.

3. The alarm as claimed in claim 1, wherein the presence of an object can be detected when the vehicle is moving and when the vehicle is stopped.

4. The alarm as claimed in claim 1, wherein said determined amplitude is stored.

5. The alarm as claimed in claim 1, wherein said energy field is established with microwave energy.

6. The alarm as claimed in claim 1, wherein said processor means establishes a third threshold in accordance with said determined amplitude above said first threshold and establishes a fourth threshold in accordance with said determined amplitude below said second threshold and begins to monitor said signal for any amplitude variations either above said third threshold or below said fourth threshold after monitoring said signal for amplitude variations across said first and said second threshold which occur when the person or object enters said energy field.

7. The alarm as claimed in claim 6, wherein said first and said second thresholds are monitored when the vehicle is stopped and said third and said fourth thresholds are monitored when the vehicle is moving.

8. The alarm as claimed in claim 7, wherein said first threshold is determined by multiplying said determined amplitude by a first number selected from a range of 1.0 to 1.2, said second threshold is determined by multiplying said determined amplitude by a second number selected from a range of 0.8 to 1.0, said third threshold is determined by multiplying said determined amplitude by a third number selected from a range of 1.2 to 2.0, and said fourth threshold is determined by multiplying said determined amplitude by a fourth number selected from a range of 0.25 to 0.8.

9. The alarm as claimed in claim 7, wherein said first threshold equals said determined amplitude multiplied by 1.1, said second threshold equals said determined amplitude multiplied by 0.9, said third threshold equals said determined amplitude multiplied by 1.5 and said fourth threshold equals said determined amplitude multiplied by 0.5.

10. The alarm as claimed in claim 1, wherein said energy field is established by a pulsed transmission.

11. The alarm as claimed in claim 1, the vehicle having at least one driver side rear tire and one passenger side rear tire, wherein said transmitter means is adapted to be positioned underneath the vehicle, said receiver means includes a first receiver adapted to be positioned underneath the vehicle in front of the driver side rear tire to receive a first portion of said energy field traveling rearward and a second receiver adapted to be positioned underneath the vehicle in front of the passenger side rear tire to receive a second portion of said energy field traveling rearward and said signal is determined in accordance with said first and said second portions of said energy field.

12. The alarm as claimed in claim 11, the vehicle having a front and a rear and said receiver means further includes a third receiver adapted to be positioned underneath the vehicle near the front to receive a third portion of said energy field which would result from the object being in front of the vehicle and a fourth receiver adapted to be positioned underneath the vehicle and toward the rear to receive a fourth portion of said energy field which would result from the object being behind the vehicle and said signal is further determined in accordance with said third and said fourth portions of said energy field.

13. The alarm as claimed in claim 12, wherein said transmitter means has a beam width in elevation selected from the range of 5° to 50°.

14. The alarm as claimed in claim 13, wherein said transmitter means has a beam width in azimuth toward said front and toward said rear of said vehicle selected from the range of 45° to 360°.

15. The alarm as claimed in claim 14, wherein each of said receivers directionally receives said portion of said energy field which approaches at an angle selected from a range of 5° to 50° in elevation or in azimuth.

16. The alarm as claimed in claim 11, wherein said transmitter means has a beam width in elevation of 30° and in azimuth of 90° toward said front and toward said rear and wherein each of said receivers directionally receives said portion of said energy field which approaches within a 30° by 30° solid angle.

17. A method for detecting the presence of a person or object near a vehicle, comprising the steps of:
establishing an energy field near the vehicle in a zone of danger for the person;
receiving a signal resulting from the energy field;
determining an amplitude of the received signal without the person being present and subsequently monitoring the received signal for any amplitude variations either across a first threshold which is above the determined amplitude or across a second threshold which is below the determined amplitude, which amplitude variations occur when the person or object enters the energy field; and
indicating any threshold crossings.

18. The method as claimed in claim 17, further comprising the step of determining the first threshold in accordance with the determined amplitude.

19. The method as claimed in claim 17, wherein the presence of the person or object can be detected when the vehicle is moving and when the vehicle is stopped.

20. The method as claimed in claim 17, wherein the amplitude is determined when the vehicle is stopped and further comprising the steps of monitoring the received signal a predetermined time later for any amplitude variations across either a third threshold which is above the first threshold or across a fourth threshold which is below the second threshold, which amplitude variations occur when the person or object enters the energy field.

21. The method as claimed in claim 20, further comprising the step of determining the first through fourth thresholds in accordance with the determined amplitude.

22. The method as claimed in claim 20, wherein the first and the second thresholds are used for a first predetermined time after the vehicle stops and the third and the fourth thresholds are used thereafter.

23. The method as claimed in claim 22, further comprising the step of determining the first through fourth thresholds in accordance with the determined amplitude.

24. The method as claimed in claim 20, wherein the first and second threshold are used when the vehicle is stopped and the third and fourth threshold are used when the vehicle is moving.

25. The method as claimed in claim 17, wherein the energy field is established by a pulsed transmission.

26. The method as claimed in claim 17, wherein said energy field is established with microwave energy.

27. The method as claimed in claim 17, further comprising the step of storing the determined amplitude.

* * * * *